C. H. Wilder,
Breast Pump,
N° 47,760. Patented May 16, 1865.
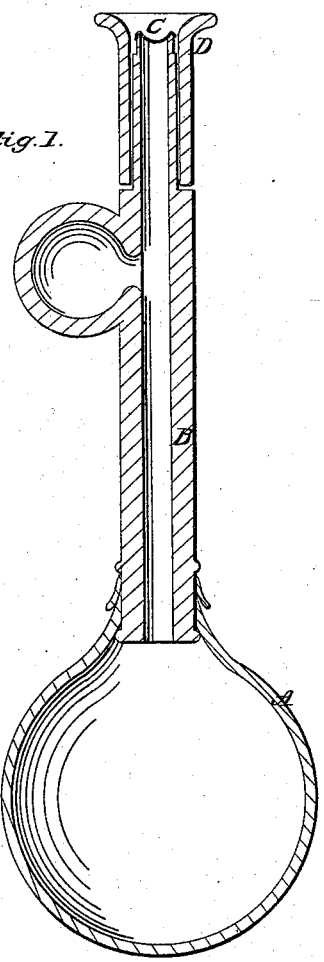
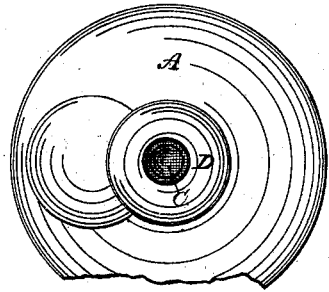
Witnesses:
Theo Tusch
C L Topliff
Inventor:
C H Wilder
per Munn & Co
atty

UNITED STATES PATENT OFFICE.

C. H. WILDER, OF ARGYLE, WISCONSIN.

IMPROVEMENT IN BREAST-PUMPS.

Specification forming part of Letters Patent No. 47,760, dated May 16, 1865.

*To all whom it may concern:*

Be it known that I, C. H. WILDER, of Argyle, in the county of Lafayette and State of Wisconsin, have invented a new and Improved Breast-Pump; and I do hereby declare that the following is a full, clear, and exact description thereof, which will enable others skilled in the art to make and use the same, reference being had to the accompanying drawings, forming a part of this specification, in which—

Figure 1 is a longitudinal central section of this invention. Fig. 2 is a plan or top view of the same.

Similar letters of reference indicate like parts.

This invention consists in the application to the mouth of a breast-pump of a supporting-screen in such a manner that the air is brought to act direct upon the end of the nipple and upon every natural course through which the milk can be drawn, and all undue strain on any part of said nipple is avoided.

The invention consists, further, in the employment or use of an extension-piece, in combination with the supporting-screen, applied to the end of the suction-pipe of a breast-pump in such a manner that the instrument can be accommodated to nipples of different length by adjusting the extension-piece, and that the pump can be operated without pain in all cases.

A represents the elastic or india-rubber bulb which forms the working part of an ordinary breast-pump, and which is secured to the end of the suction-pipe B by a cord or any other suitable means in the usual manner. The outer end of the suction-pipe is covered by a screen, C, which may be made of wire-gauze or any other suitable material, separate and distinct from the pipe, or it may be made solid with said pipe and perforated with small holes. This screen is made concave, to correspond to the end of the nipples with which it comes in contact, and when the pump is in operation it supports the nipple and causes the air to act direct upon the end of the nipple and upon every natural course through which the milk can be drawn. The mouthpiece D of the suction-pipe is attached to said pipe so that it can be extended and adjusted in relation to the supporting-screen according to the size of the nipple on which the pump is intended to operate. Said mouthpiece may either be arranged so that it will slide in and out on the end of the suction-pipe, or it may be applied with a screw-thread, or in any other suitable manner which will allow of elongating or shortening said mouthpiece. If it is made to slide in and out, suitable packing of india-rubber or other substance or material must be applied to render the joint air-tight.

In order to operate the pump it is applied to the breast in the ordinary manner, and the mouth-piece is drawn out until the nipple just touches the supporting-screen. When the pump is put in operation, the nipple draws out gradually, and the mouth-piece is elongated as much as can be done without producing pain.

By the supporting-screen the trouble of a broken breast is saved to the patient and the pump can be used to the best advantage. The screen brings the air to act upon every natural course through which the milk can be drawn and the pump can be easily adjusted to nipples of different size.

This attachment to a breast pump is cheap, simple, not liable to get out of order, and it increases the power and usefulness of the pump very materially.

I claim as new and desire to secure by Letters Patent—

1. The application to the mouth of a breast-pump of a supporting-screen, constructed and operating substantially in the manner and for the purpose set forth.

2. The employment or use of an extension mouth-piece, D, applied, in combination with the supporting-screen and with the suction-pipe of a breast-pump, substantially in the manner and for the purpose described.

C. H. WILDER.

Witnesses:
 EBEN POLK,
 J. S. WADDINGTON.